US012626117B2

(12) United States Patent
Jin et al.

(10) Patent No.: US 12,626,117 B2
(45) Date of Patent: May 12, 2026

(54) MEMORY DEVICE FOR PERFORMING CONVOLUTION OPERATION

(71) Applicant: SK hynix Inc., Gyeonggi-do (KR)

(72) Inventors: Young Jae Jin, Gyeonggi-do (KR); Ki Young Kim, Gyeonggi-do (KR); Sang Eun Je, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 1126 days.

(21) Appl. No.: 17/565,915

(22) Filed: Dec. 30, 2021

(65) Prior Publication Data

US 2023/0043170 A1      Feb. 9, 2023

(30) Foreign Application Priority Data

Aug. 3, 2021      (KR) ......................... 10-2021-0102202

(51) Int. Cl.
  *G06N 3/065*      (2023.01)
  *G06F 7/50*      (2006.01)
  *G06F 7/523*      (2006.01)
  *G06F 7/544*      (2006.01)

(52) U.S. Cl.
  CPC .............. *G06N 3/065* (2023.01); *G06F 7/50* (2013.01); *G06F 7/523* (2013.01); *G06F 7/5443* (2013.01)

(58) Field of Classification Search
  CPC ........ G06N 3/04; G06N 3/0464; G06N 3/063; G06N 3/065; G06F 17/153; G06F 17/16; G06F 7/50; G06F 7/523; G06F 7/5443; G11C 13/0002; G11C 11/54
  See application file for complete search history.

(56) References Cited

U.S. PATENT DOCUMENTS

| | | | | |
|---|---|---|---|---|
| 2018/0113649 A1* | 4/2018 | Shafiee Ardestani | .. | G06N 3/063 |
| 2020/0026993 A1 | 1/2020 | Otsuka | | |
| 2021/0232902 A1* | 7/2021 | Gupta | .................... | G06N 3/045 |

(Continued)

FOREIGN PATENT DOCUMENTS

| | | |
|---|---|---|
| CN | 107533459 A | 1/2018 |
| CN | 112989267 A | 6/2021 |
| KR | 10-2020-0076571 A | 6/2020 |

(Continued)

OTHER PUBLICATIONS

A. James et al., Introduction to Memristive HTM Circuits, InTEch, doi: 10.5772/intechopen.70123, Ch 10, 2018 (Year: 2018).*

(Continued)

*Primary Examiner* — Emily E Larocque
(74) *Attorney, Agent, or Firm* — IP & T GROUP LLP

(57) ABSTRACT

A memory device performs a convolution operation. The memory device includes first to N-th processing elements (PEs), a first analog-to-digital converter (ADC), a first shift adder, and a first accumulator. The first to N-th PEs, where N is a natural number equal to or greater than 2, are respectively associated with at least one weight data included in a weight feature map and are configured to perform a partial convolution operation with at least one input data included in an input feature map. The first ADC is configured to receive a first partial convolution operation result from the first to N-th PEs. The first shift adder shifts an output of the first ADC. The first accumulator accumulates an output from the first shift adder.

8 Claims, 12 Drawing Sheets

(56)        References Cited

U.S. PATENT DOCUMENTS

2022/0335278 A1* 10/2022 Wu ........................ G06N 3/065

FOREIGN PATENT DOCUMENTS

KR            10-2141385 B1      8/2020
KR      10-2020-0103262 A      9/2020
KR      10-2020-0110165 A      9/2020

OTHER PUBLICATIONS

Xiaochen Peng et al., User Manual of DNN+NeuroSim Framework V1.1, Dec. 1, 2019, p. 1-23.
Leibin Ni et al., An Energy-efficient Matrix Multiplication Accelerator by Distributed In-memory Computing on Binary RRAM Crossbar, Asia and South Pacific Design Automation Conference (ASP-DAC), Jan. 2016, p. 280-285, 978-1-4673-9569-4/16, IEEE.
A. Shafiee et al., "ISAAC: A Convolutional Neural Network Accelerator with In-Situ Analog Arithmetic in Crossbars", 2016 ACM/IEEE 43rd Annual International Symposium on Computer Architecture, 2016, pp. 14-26, IEEE.
Office Action for Korean Patent Application No. 10-2021-0102202 issued by the Korean Intellectual Property Office (KIPO) on Apr. 3, 2025.
Office Action for Chinese Patent Application No. 202210194382.0 issued by the Chinese Patent Office on Dec. 4, 2025.

* cited by examiner

Figure 4:
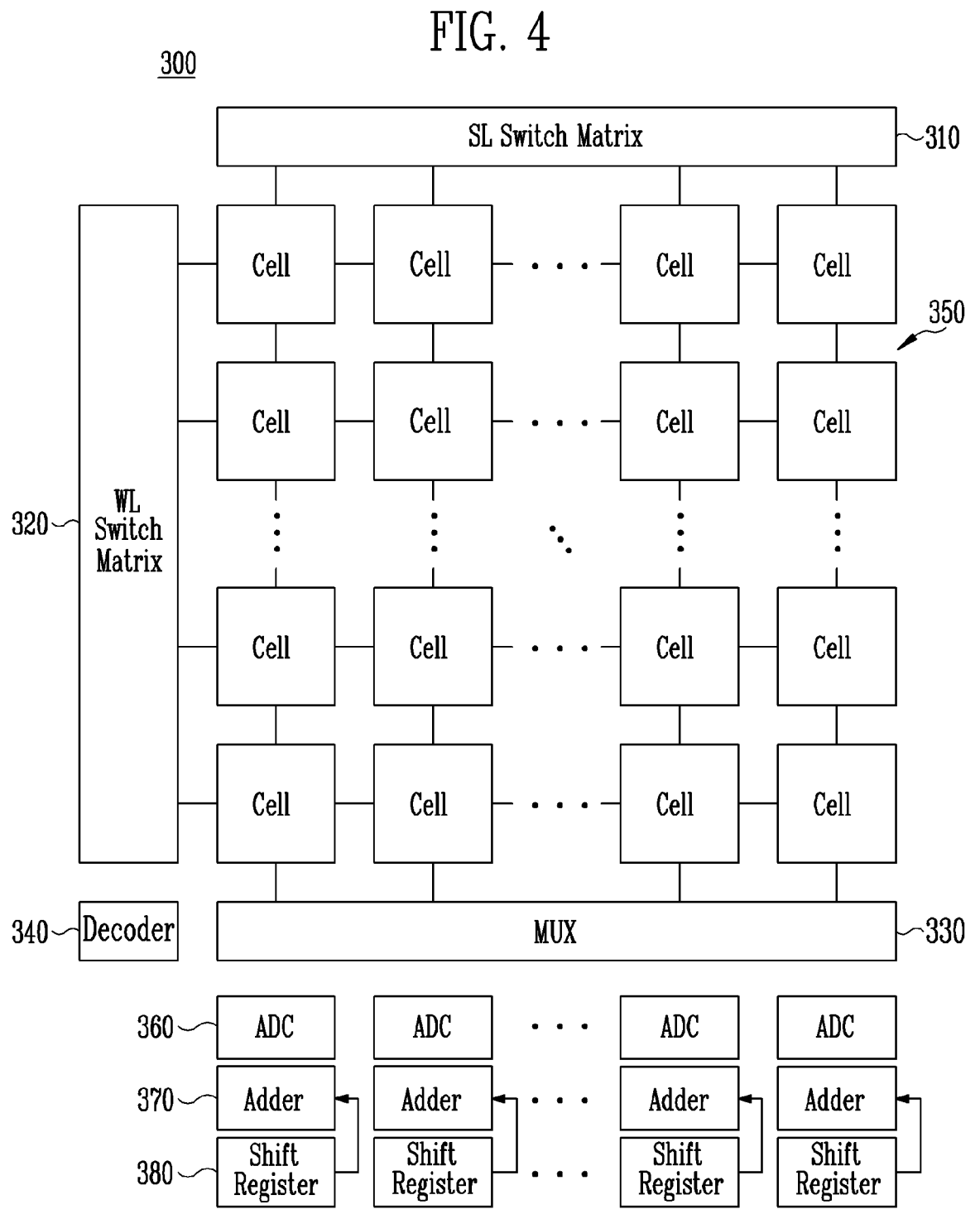

| SL Switch Matrix | ~310 |

| WL Switch Matrix 320 | Cell | Cell | · · · | Cell | Cell |
| | Cell | Cell | · · · | Cell | Cell |
| | Cell | Cell | | Cell | Cell |
| | Cell | Cell | · · · | Cell | Cell |

350

340 ~ Decoder | MUX | ~330

360 ~ ADC · · · ADC ADC ADC

370 ~ Adder ← Adder · · · Adder ← Adder ←

380 ~ Shift Register | Shift Register · · · Shift Register | Shift Register

FIG. 7D

MEMORY DEVICE FOR PERFORMING CONVOLUTION OPERATION

CROSS-REFERENCE TO RELATED APPLICATION

The present application claims priority under 35 U.S.C. § 119 (a) to Korean patent application number 10-2021-0102202, filed on Aug. 3, 2021, and which is incorporated herein by reference in its entirety.

BACKGROUND

Field of Invention

The present disclosure relates to an electronic device, and more particularly, to a memory device for performing a convolution operation.

Description of Related Art

Input data of an artificial neural network configured of only fully connected layers is limited to a one-dimensional (arrangement) form. On the other hand, one color picture is three-dimensional data, and several pictures used in a batch mode are 4D data. When a fully connected (FC) neural network is required to be learned with picture data, three-dimensional picture data is required to be flattened into one dimension. Spatial information is lost in a process of flattening the picture data. As a result, the artificial neural network is inefficient in extracting and learning features caused by information lack due to loss of image spatial information, and increasing an accuracy is limited. A model capable of learning while maintaining spatial information of an image is a convolutional neural network (CNN).

SUMMARY

An embodiment of the present disclosure provides a memory device that performs a convolution operation capable of reducing manufacturing cost.

According to an embodiment of the present disclosure, a memory device performs a convolution operation. The memory device includes first to N-th processing elements (PEs), a first analog-to-digital converter (ADC), a first shift adder, and a first accumulator. The first to N-th PEs are respectively associated with at least one weight data piece included in a weight feature map and are configured to perform a partial convolution operation with at least one input data piece included in an input feature map. The first ADC is configured to receive a first result of partial convolution operation from the first to N-th PEs. The first shift adder shifts and adds an output of the first ADC. The first accumulator accumulates an output from the first shift adder. Here, N may be a natural number equal to or greater than 2.

In an embodiment of the present disclosure, each of the first to N-th PEs may include first to k-th synaptic arrays. Here, k may be a natural number equal to or greater than 2.

In an embodiment of the present disclosure, the first ADC may receive an output of the first synaptic array of each of the first to N-th PEs as the first result.

In an embodiment of the present disclosure, the first ADC may receive a sum of an output current of the first synaptic array of each of the first to N-th PEs.

In an embodiment of the present disclosure, the memory device may further include a second ADC configured to receive a second result of the partial convolution operation from the first to N-th PEs, a second shift adder configured to shift an output of the second ADC, and a second accumulator configured to accumulate an output from the second shift adder.

In an embodiment of the present disclosure, the second ADC may receive an output of a second synaptic array of each of the first to N-th PEs as the second result.

In an embodiment of the present disclosure, the second ADC may receive a sum of an output current of the second synaptic array of each of the first to N-th PEs.

In an embodiment of the present disclosure, each of the first to k-th synaptic arrays may include a plurality of memristors.

According to another embodiment of the present disclosure, a convolution operational apparatus included in a memristor-based deep learning accelerator includes plural processing elements (PEs) and a digital operating circuit. The plural processing elements (PEs) are configured to perform an operation of equation 2 on a partial map of an input feature map with a weight feature map through an analog MAC operation to generate respective currents. The digital operating circuit is configured to comprehensively convert the currents into respective binary values and perform an operation of equation 1.

$$PR_{RiCj} = I \otimes W \qquad \text{[Equation 1]}$$

$$= \begin{bmatrix} I_{11} & \cdots & I_{1M} \\ \vdots & \ddots & \vdots \\ I_{N1} & \cdots & I_{NM} \end{bmatrix} \otimes \begin{bmatrix} W_{11} & \cdots & W_{1M} \\ \vdots & \ddots & \vdots \\ W_{N1} & \cdots & W_{NM} \end{bmatrix}$$

$$= \sum_{L=1}^{NM} I_L * W_L$$

$$= \sum_{L=1}^{NM} \left( \sum_{K=0}^{P-1} V_{IL(2)} * V_{WLK(2)} * 2^K \right)$$

$$= \sum_{L=1}^{NM} \left( \sum_{K=0}^{P-1} C_{LK} * 2^K \right)$$

$$C_{LK} = V_{IL(2)} * V_{WLK(2)} \qquad \text{[Equation 2]}$$

Here, "$PR_{RiCj}$" is a result of the operation of the shift adder, "I" is the partial map, "W" is the weight feature map, "$\otimes$" is a convolution operator, "$I_L$" is an element of the partial map, "$W_L$" is an element of the weight feature map and corresponds to one of the PEs, "$V_{IL(2)}$" is a binary value of the element of the partial map, "$V_{WLK(2)}$" is a binary value of K-th bit within the element of the weight feature map, "$C_{LK}$" is the current, "N" is a number of rows in each of the partial map and the weight feature map, "M" is a number of columns in the partial map or the weight feature map, and "P" is a number of bits of the element of each of the partial map and the weight feature map. The present technology may provide a memory device that performs a convolution operation, which may reduce manufacturing cost.

BRIEF DESCRIPTION OF THE DRAWINGS

FIG. 4 is a diagram illustrating a structure of a synaptic array shown in FIG. 3 according to an embodiment of the present disclosure.

FIGS. 7A to 7D are diagrams illustrating a convolution operation of a memory device according to an embodiment of the present disclosure.

DETAILED DESCRIPTION

Specific structural or functional descriptions of embodiments according to the concepts which are disclosed in the present specification are illustrated only to describe the embodiments according to the concepts of the present disclosure. The embodiments according to the concepts of the present disclosure may be carried out in various forms and should not be construed as being limited to the embodiments described in the present specification.

Figure 1:
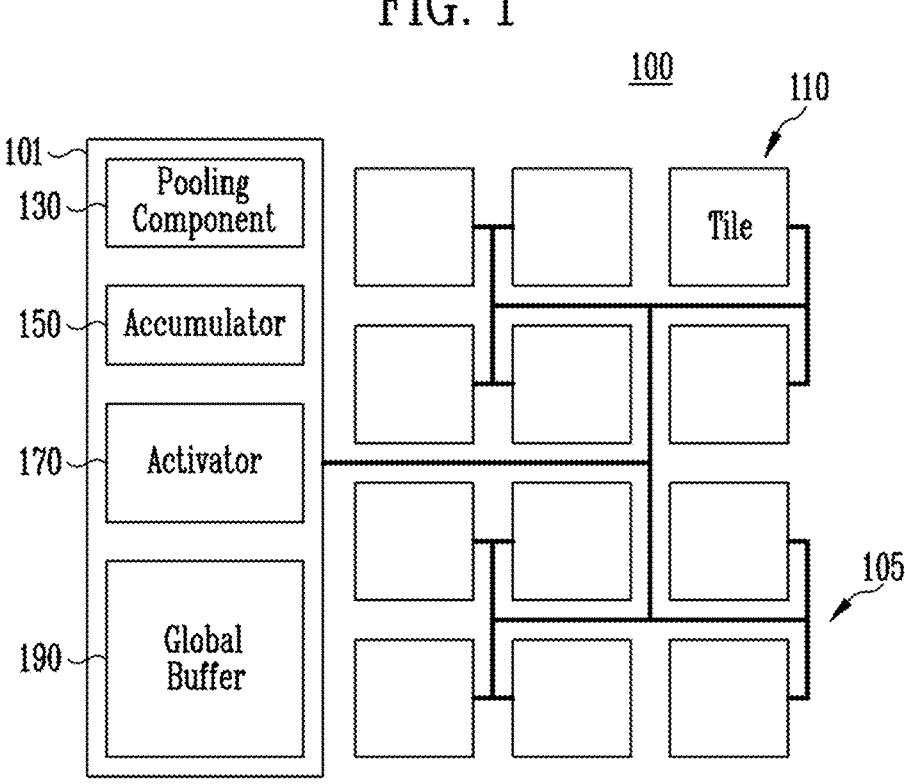
FIG. 1 is a chip-level diagram of a memory device according to an embodiment of the present disclosure.

FIG. 1 is a chip-level diagram of a memory device according to an embodiment of the present disclosure.

Referring to FIG. 1, the memory device 100 may include a plurality of tiles 110 and a peripheral circuit 101. The peripheral circuit 101 may include a pooling component 130, an accumulator 150, an activator 170, and a global buffer 190.

In a convolutional neural network, input data may be transmitted to the plurality of tiles 110. At this time, divided pieces of data generated by applying a sliding window to the input data in an original form may be transmitted to the respective tiles.

In an embodiment, the pooling component 130 generates a new layer by resizing a convolution layer configuring an activation map generated through a convolution operation. In another embodiment, the pooling component 130 may generate a set of feature values for pixel data that belongs within a predetermined range. For example, the pooling component 130 may perform a max pooling operation of outputting a largest value among the pixel data that belongs within the predetermined range as the feature value. In another example, the pooling component 130 may perform an average pooling operation of outputting an average value of the pixel data that belongs within the predetermined range as the feature value. In addition, the pooling component 130 may perform stochastic pooling or cross channel pooling. Through the pooling operation, a parameter may be reduced, thereby suppressing over fitting of a corresponding network. In addition, by performing the pooling operation, a burden of a subsequent operation may be reduced, hardware resources may be saved, and a speed of the convolution operation may be improved.

The activator 170 may activate an operation of each of the tiles 110, and the global buffer 190 may buffer input data and output data.

Referring to FIG. 1, a line structure 105 connected to each of the tiles 110 from the activator 170 may be implemented as an H-tree structure. Due to the H-tree structure, a delay time of a data input/output line from the activator 170 to each of the tiles 110 may be uniformly controlled.

Figure 2:
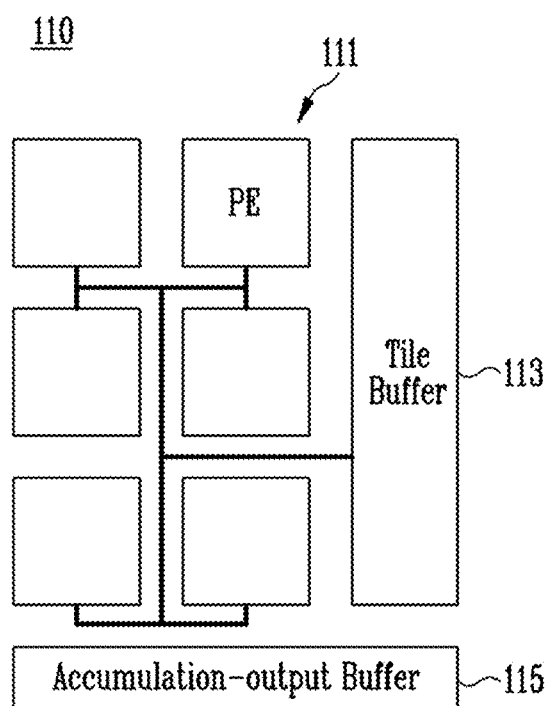
FIG. 2 is a block diagram illustrating a structure of a tile included in FIG. 1 according to an embodiment of the present disclosure.

FIG. 2 is a block diagram illustrating a structure of the tile included in FIG. 1 according to an embodiment of the present disclosure.

Referring to FIG. 2, the tile 110 may include a plurality of processing elements (PEs) 111, a tile buffer 113, and an accumulation-output buffer 115. A line structure connecting the tile buffer 113 and each of the PEs 111 may be implemented as an H-tree structure. Accordingly, as described above, a delay time of a data input/output line from the tile buffer 113 to each of the PEs 111 may be uniformly controlled. Moreover, data input to one PE through the tile buffer 113 may be transmitted from the corresponding PE to another PE under a predetermined condition. Through this, a capacity required for the tile buffer 113 may be reduced. The accumulation-output buffer 115 may accumulate a data processing result calculated by each PE, and output accumulated data.

Figure 3:
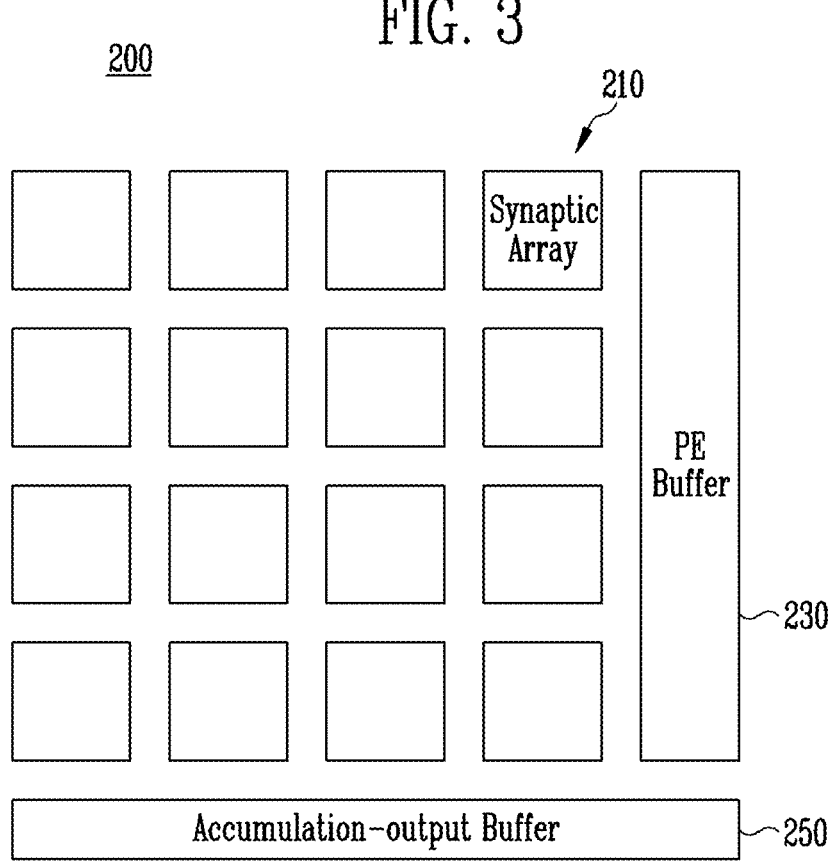
FIG. 3 is a diagram illustrating a structure of a processing element (PE) shown in FIG. 2 according to an embodiment of the present disclosure.

FIG. 3 is a diagram illustrating a structure of the PE shown in FIG. 2 according to an embodiment of the present disclosure. Referring to FIG. 3, the PE 200 may include a plurality of synaptic arrays 210, a PE buffer 230, and an accumulation-output buffer 250. Each synaptic array 210 may receive data from the PE buffer 230 and perform synaptic processing. A result of the synaptic processing performed by each synaptic array 210 may be transmitted to the accumulation-output buffer 250. The accumulation-output buffer 210 may accumulate a synaptic processing result calculated by each synaptic array 210 and output accumulated data.

FIG. 4 is a diagram illustrating a structure of the synaptic array shown in FIG. 3 according to an embodiment of the present disclosure. Referring to FIG. 4, the synaptic array 300 may include a source line switch matrix 310, a word line switch matrix 320, a MUX (multiplexer) 330, a decoder 340, a plurality of cells 350, a plurality of ADCs 360, a plurality of adders 370, and a plurality of shift registers 380.

The cell 350 may be implemented in various methods. In an embodiment, the cells included in the synaptic array 300 may be implemented in a one-transistor-one-resistor (1T1R) structure.

Data may be transmitted to target cells through the source line switch matrix 310. Meanwhile, the word line switch matrix 320 may activate the target cells based on an address. Meanwhile, the MUX 330 may multiplex an output from the cells and transmit the output to each of the ADCs. The decoder 340 may control an operation of the MUX 330.

The memory device shown in FIGS. 1 to 4 may be implemented as an example of a memristor-based (or 1T1R array cell-based) deep learning accelerator structure. As described above, the plurality of PEs and the plurality of synaptic arrays exist in the memory device, and the synaptic array may perform an analog MAC operation. The analog MAC operation is performed according to Ohm's law and Kirchhoff's current law by the synaptic array 300 including the cells of the 1T1R structure.

As shown in FIG. 4, the synaptic array included in the memory device includes the plurality of ADCs. That is, a memory element of the synaptic array is configured in a shape of a cross bar, and the ADC 360 sensing an output current exists in each column. An output of the ADC 360 may be transmitted to the adder 370 and the shift register 380. The adder 370 and the shift register 380 may perform a multiplication operation of a digital value through an addition operation and a shift operation on digital values sequentially output from the ADC 360.

In FIG. 4, the ADC 360 is included for as many as the number of columns, however, the present disclosure is not limited thereto. In another embodiment, the number of ADCs 360 may be less than the number of columns of the memory cells. In this case, the output from each column may be transmitted to an appropriate ADC through the MUX. When the number of ADCs 360 is less than the number of columns of the memory cells, an implementation area of a circuit may be reduced, but a data processing speed may be slowed.

Figure 5:
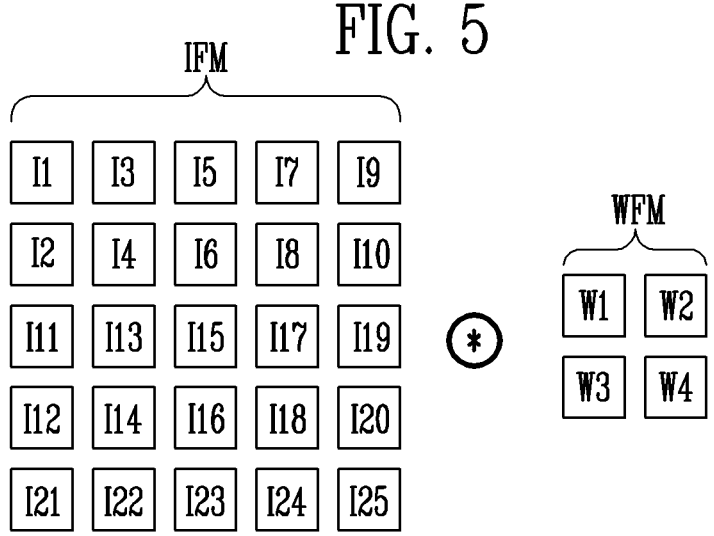
FIG. 5 is a diagram illustrating a convolution operation through an input feature map and a weight feature map according to an embodiment of the present disclosure.

FIG. 5 is a diagram illustrating a convolution operation through an input feature map and a weight feature map according to an embodiment of the present disclosure.

Referring to FIG. 5, the input feature map IFM is data having a size of 5 horizontally and 5 vertically, and a weight feature map WFM is data having a size of 2 horizontally and 2 vertically. The input feature map IFM includes data pieces I1 to I25, and the weight feature map WFM includes data pieces W1 to W4. More specifically, a first row of the input feature map IFM includes data pieces I1, I3, I5, I7, and I9, a second row includes data pieces I2, I4, I6, I8, and I10, a third row includes data pieces I11, I13, I15, I17, and I19, a fourth row includes data pieces I12, I14, I16, I18, and I20, and a fifth row includes pieces data I21, I22, I23, I24, and I25. Moreover, a first row of the weight feature map WFM includes data pieces W1 and W2, and a second row includes data pieces W3 and W4. However, this is an example, and the input feature map IFM and the weight feature map WFM of various sizes may be applied.

Figure 6A:
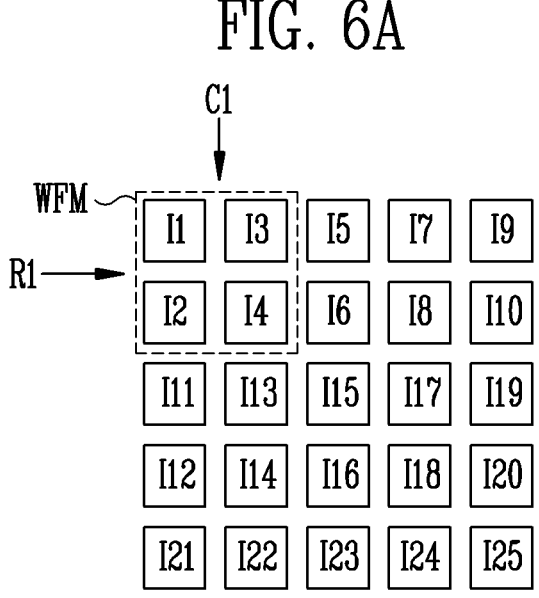
FIGS. 6A to 6C are diagrams illustrating a convolution operation of the input feature map IFM and the weight feature map WFM according to an embodiment of the present disclosure.
Figures 6B, 6C:
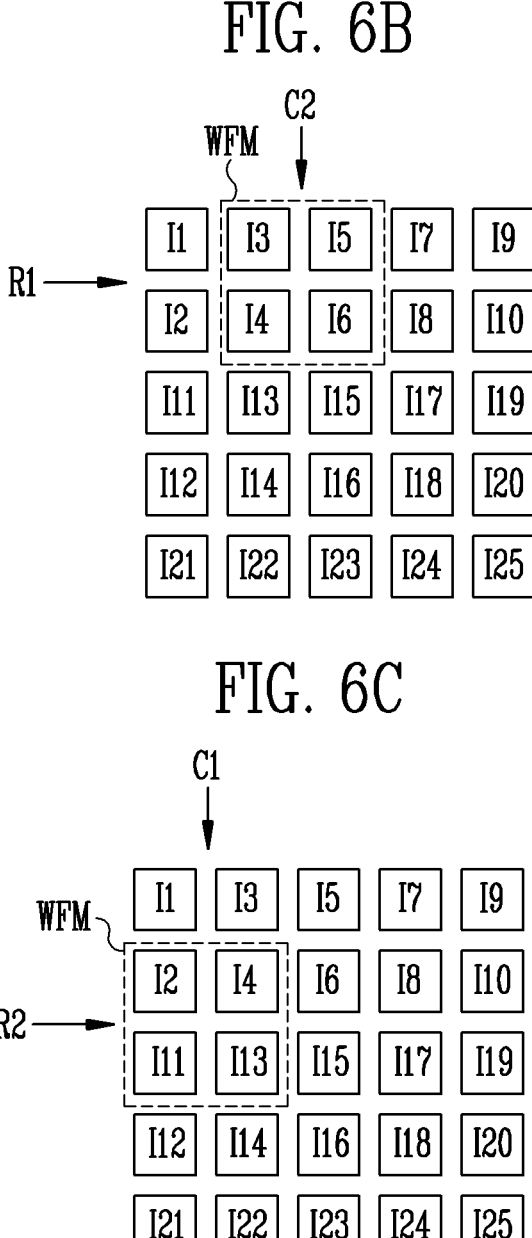

FIGS. 6A to 6C are diagrams illustrating a convolution operation of the input feature map IFM and the weight feature map WFM according to an embodiment of the present disclosure. Referring to FIG. 6A, in order to perform the convolution operation of the input feature map IFM and the weight feature map WFM, the weight feature map WFM may be positioned at a position (R1, C1). When the weight feature map WFM is positioned at the position (R1, C1), the data pieces W1, W2, W3, and W4 of the weight feature map WFM correspond to the data pieces I1, I3, I2, and I4 of the input feature map IFM, respectively. That is, in a state in which the weight feature map WFM is positioned at the position (R1, C1), a partial result PR$_{R1,C1}$ of the convolution operation may be expressed as in Equation 1 below.

$$PR_{R1,C1}=I1 \cdot W1 + I3 \cdot W2 + I2 \cdot W3 + I4 \cdot W4 \qquad \text{[Equation 1]}$$

After performing the operation according to Equation 1, referring to FIG. 6B, the weight feature map WFM may be positioned at a position (R1, C2). When the weight feature map WFM is positioned at the position (R1, C2), the data pieces W1, W2, W3, and W4 of the weight feature map WFM correspond to the data pieces I3, I5, I4, and I6 of the input feature map IFM, respectively. That is, in a state in which the weight feature map WFM is positioned at the position (R1, C2), a partial result PR$_{R1,C2}$ of the convolution operation may be expressed as in Equation 2 below.

$$PR_{R1,C2}=I3 \cdot W1 | I5 \cdot W2 | I4 \cdot W3 | I6 \cdot W4 \qquad \text{[Equation 2]}$$

In such a method, the convolution operation may be performed on each case where the weight feature map WFM is positioned at a position (R1, C3) and a position (R1, C4). After the convolution operation of the case where the weight feature map WFM is positioned at the position (R1, C4) is performed, the weight feature map WFM may no longer be moved to a right of the input feature map IFM. Therefore, the weight feature map WFM may be positioned at a position (R2, C1) by changing a row as shown in FIG. 6C. When the weight feature map WFM is positioned at the position (R2, C1), the data pieces W1, W2, W3, and W4 of the weight feature map WFM correspond to the data pieces I2, I4, I11, and I13 of the input feature map IFM, respectively. That is, in a state in which the weight feature map WFM is positioned at the position (R2, C1), a partial result PR$_{R2,C1}$ of the convolution operation may be expressed as in Equation 3 below.

$$PR_{R2,C1}=I2 \cdot W1 + I4 \cdot W2 + I11 \cdot W3 + I13 \cdot W4 \qquad \text{[Equation 3]}$$

In such a method, the operation described above may be repeatedly performed until the weight feature map WFM is positioned at a position (R4, C4). In conclusion, a convolution operation result CNV of the input feature map IFM and the weight feature map WFM may be expressed as in Equation 4 below.

$$CNV = \sum_{i=1}^{4} \sum_{j=1}^{4} PR_{Ri,Cj} \qquad \text{[Equation 4]}$$

FIGS. 7A to 7D are diagrams illustrating a convolution operation of a memory device according to an embodiment of the present disclosure. Hereinafter, the convolution operation of the memory device according to an embodiment of the present disclosure is described with reference to FIGS. 7A to 7D together. In FIGS. 7A to 7D, first to fourth PEs PE #1 to PE #4 or 410 to 440 are shown among the plurality of PEs illustrated in FIG. 2. The first PE PE #1 or 410 performs a convolution operation related to the data piece W1 in the weight feature map WFM. The second PE PE #2 or 420 performs a convolution operation related to the data piece W2 in the weight feature map WFM. The third PE PE #3 or 430 performs a convolution operation related to the data piece W3 in the weight feature map WFM. The fourth PE PE #4 or 440 performs a convolution operation related to the data piece W4 in the weight feature map WFM. For convenience of discussion, the ADC, the adder, and the shift register connected to each of the synaptic arrays are omitted in FIGS. 7A to 7D.

Figure 7A:
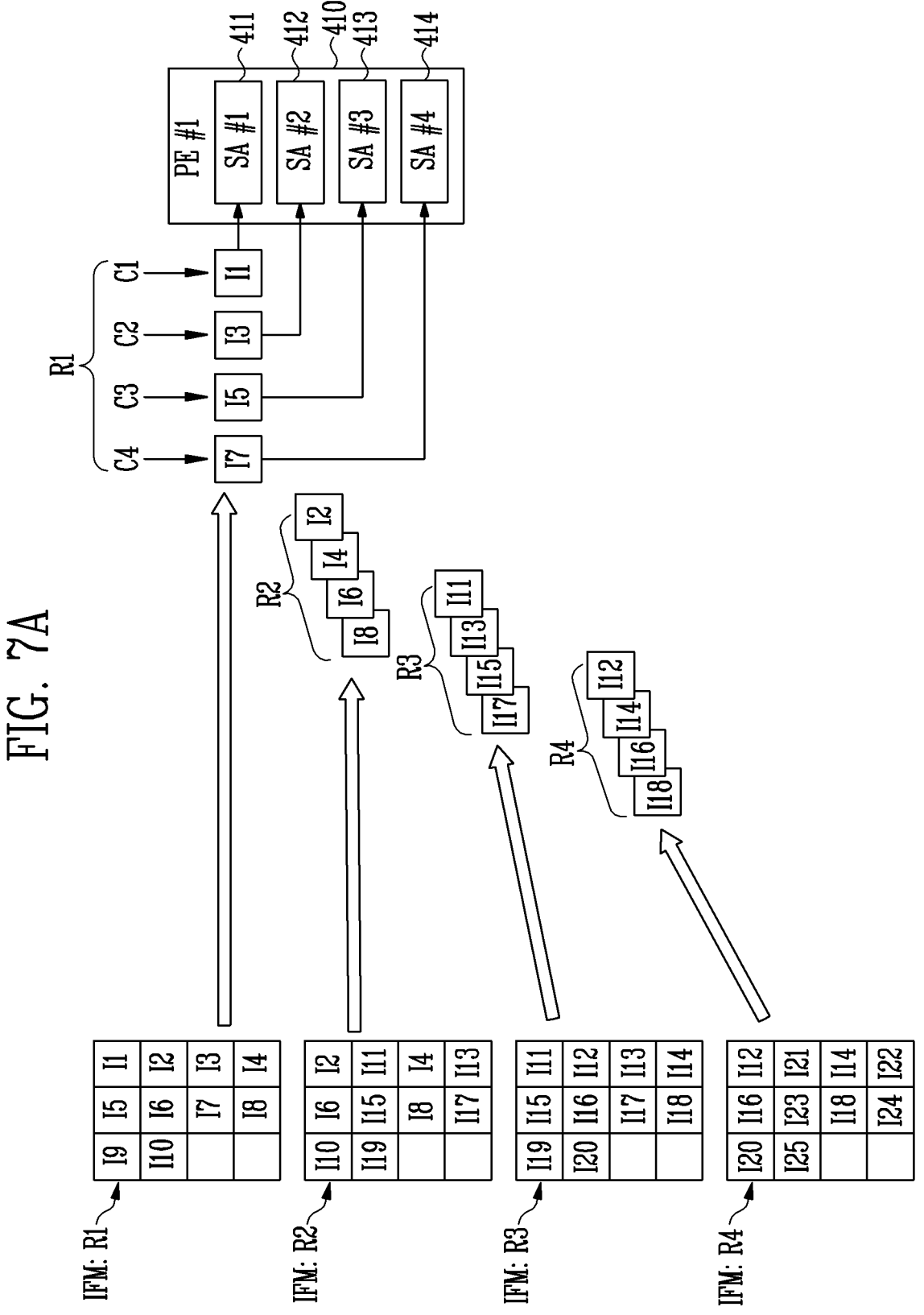

Referring to FIG. 7A, an embodiment in which the convolution operation related to the data piece W1 in the weight feature map WFM is performed through the first PE PE #1 or 410 is shown. In the state in which the weight feature map WFM is positioned at the position (R1, C1), the data piece I1 is input to a first synaptic array SA #1 or 411 of the first PE PE #1, and "I1·W1" operation is performed.

Figure 7B:
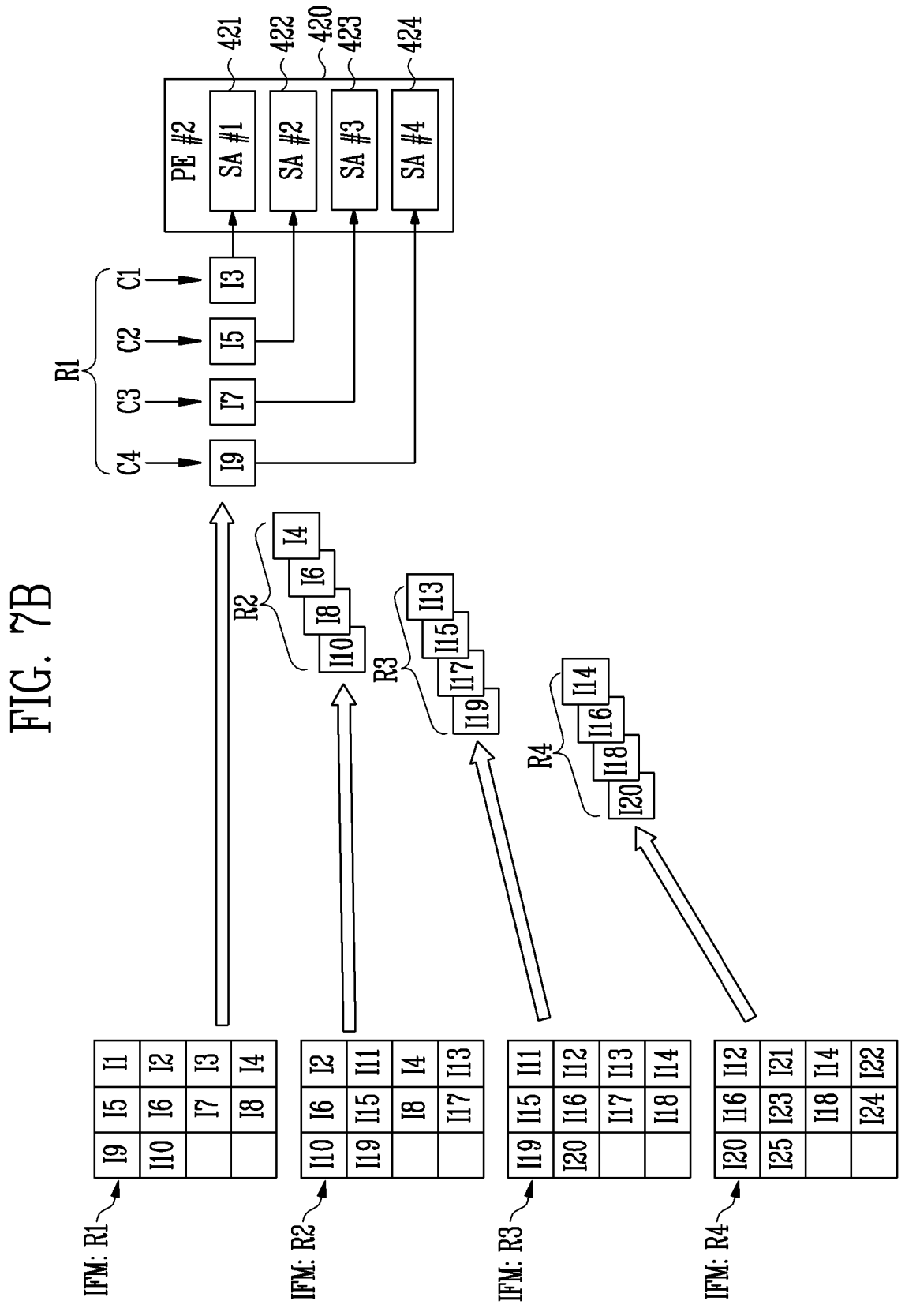

Referring to FIG. 7B, an embodiment in which the convolution operation related to the data piece W2 in the weight feature map WFM is performed through the second PE PE #2 or 420 is shown. In the state in which the weight feature map WFM is positioned at the position (R1, C1), the data piece I3 is input to the first synaptic array SA #1 or 421 of the second PE PE #2, and "I3·W2" operation is performed.

Figure 7C:
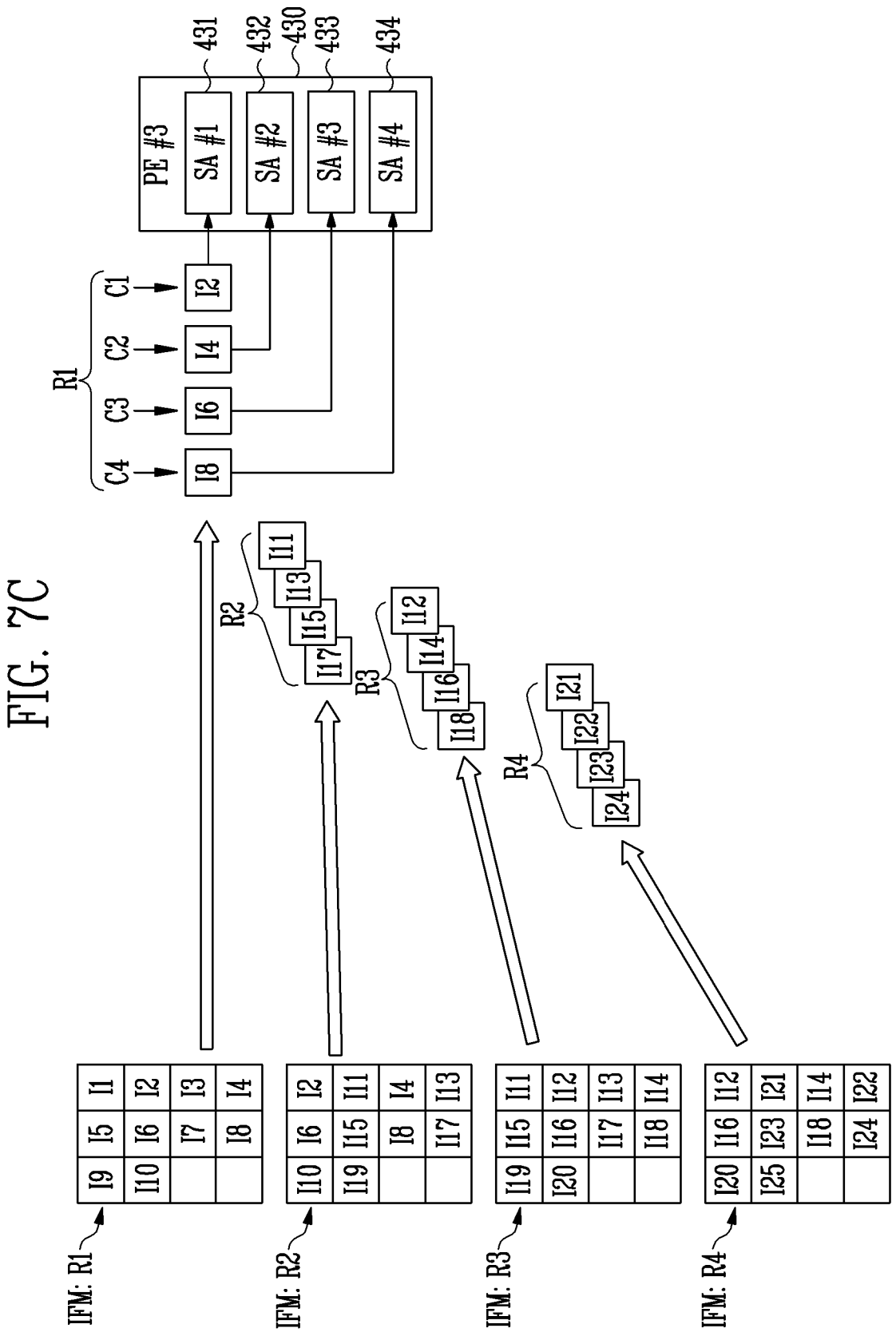

Referring to FIG. 7C, an embodiment in which the convolution operation related to the data piece W3 in the weight feature map WFM is performed through the third PE PE #3 or 430 is shown. In the state in which the weight feature map WFM is positioned at the position (R1, C1), the data piece I2 is input to the first synaptic array SA #1 or 431 of the third PE PE #3, and "I2·W3" operation is performed.

Figure 7D:
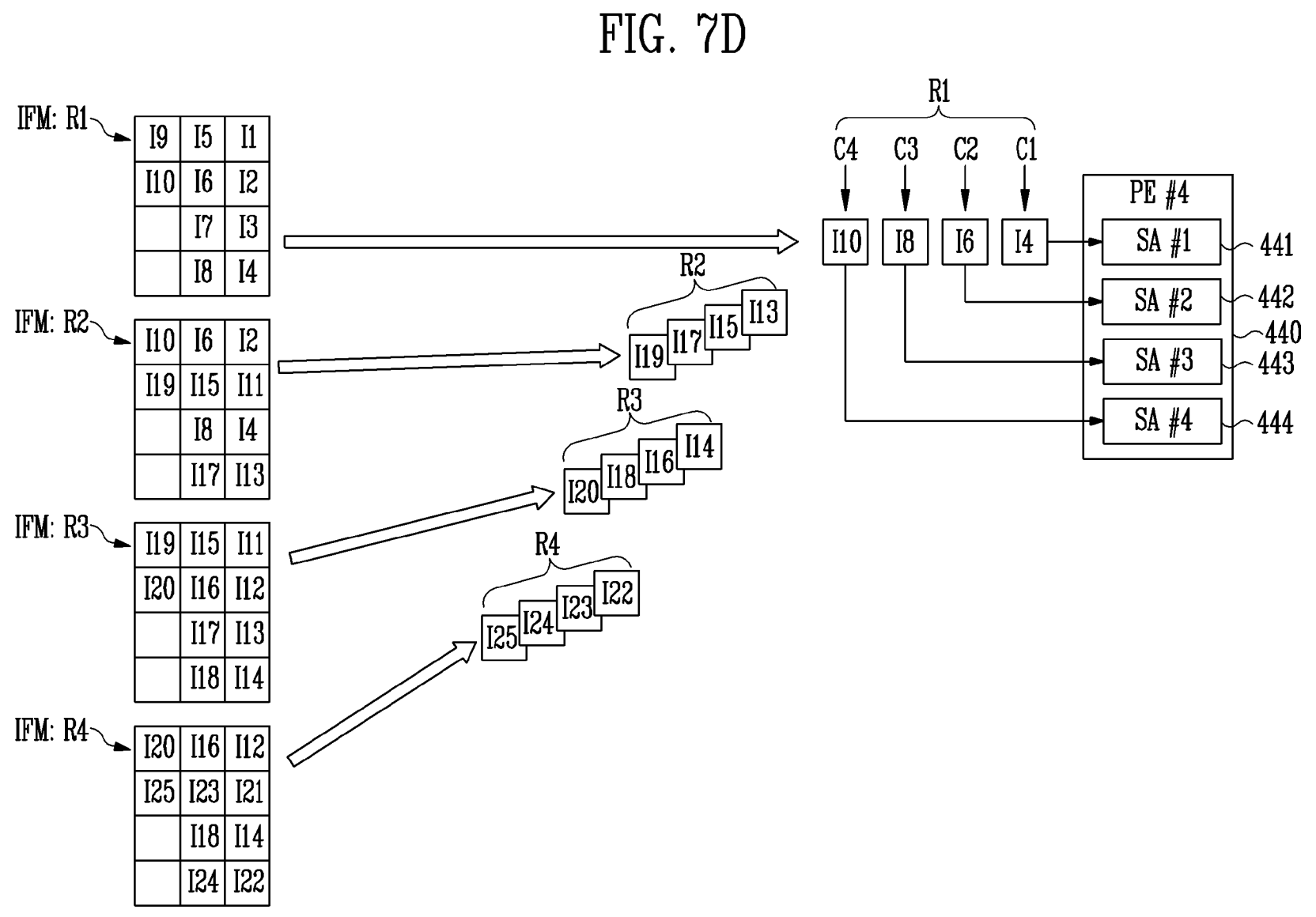

Referring to FIG. 7D, an embodiment in which the convolution operation related to the data piece W4 in the weight feature maps WFM is performed through the fourth PE PE #4 or 440 is shown. In the state in which the weight feature map WFM is positioned at the position (R1, C1), the data piece I4 is input to the first synaptic array SA #1 or 441 of the fourth PE PE #4, and "I4·W4" operation is performed.

That is, referring to FIGS. 7A to 7D, in the state in which the weight feature map WFM is positioned at the position (R1, C1), the first synaptic arrays 411, 421, 431, and 441 of the first to fourth PEs PE #1 to PE #4 or 410 to 440 perform "I1·W1", "I3·W2", "I2·W3", and "I4·W4" operations, respectively. As described by Equation 1, when all of the "I1·W1", "I3·W2", "I2·W3", and "I4·W4" are added, in the state in which the weight feature map WFM is positioned at the position (R1, C1), the partial result $PR_{R1,C1}$ of the convolution operation may be calculated. That is, an output result by the first synaptic arrays 411, 421, 431, and 441 of the first to fourth PEs PE #1 to PE #4 or 410 to 440 are transmitted to the accumulation-output buffer. The accumulation and output buffer adds "I1·W1", "I3·W2", "I2·W3", and "I4·W4" which are values output by the first synaptic arrays 411, 421, 431, and 441 of the first to fourth PEs PE #1 to PE #4 or 410 to 440, and stores a value obtained by the addition.

According to that shown in FIGS. 7A to 7D, in the state in which the weight feature map WFM is positioned at the position (R1, C2), second synaptic arrays 412, 422, 432, and 442 of the first to fourth PEs PE #1 to PE #4 or 410 to 440 perform "I3·W1", "I5·W2", "I4·W3", and "I6·W4" operations, respectively. As described by Equation 2, when all of the "I3·W1", "I5·W2", "I4·W3", and "I6·W4" are added, in the state in which the weight feature map WFM is positioned at the position (R1, C2), the partial result $PR_{R1,C2}$ of the convolution operation may be calculated.

Similarly, in the state in which the weight feature map WFM is positioned at the position (R1, C3), third synaptic arrays 413, 423, 433, and 443 of the first to fourth PEs PE #1 to PE #4 or 410 to 440 perform "I5·W1", "I7·W2", "I6·W3", and "I8·W4" operations, respectively. In addition, in the state in which the weight feature map WFM is positioned at the position (R1, C4), fourth synaptic arrays 414, 424, 434, and 444 of the first to fourth PES PE #1 to PE #4 or 410 to 440 perform "I7·W1", "I9·W2", "I8·W3", and "I10·W4" operations, respectively.

That is, according to that shown in FIGS. 7A to 7D, when each of the first to fourth PEs PE #1 to PE #4 or 410 to 440 includes four synaptic arrays, with respect to a first row R1, a partial result of a convolution operation corresponding to four columns C1 to C4 may be simultaneously calculated. After calculating the partial result of the convolution operation corresponding to the four columns C1 to C4 with respect to the first row R1, a partial result of the four columns C1 to C4 with respect to a second row R2 may be calculated by changing a row. When such a process is performed up to a fourth row R4, the convolution operation result CNV of the input feature map IFM and the weight feature map WFM described in Equation 3 may be obtained.

Figure 8:
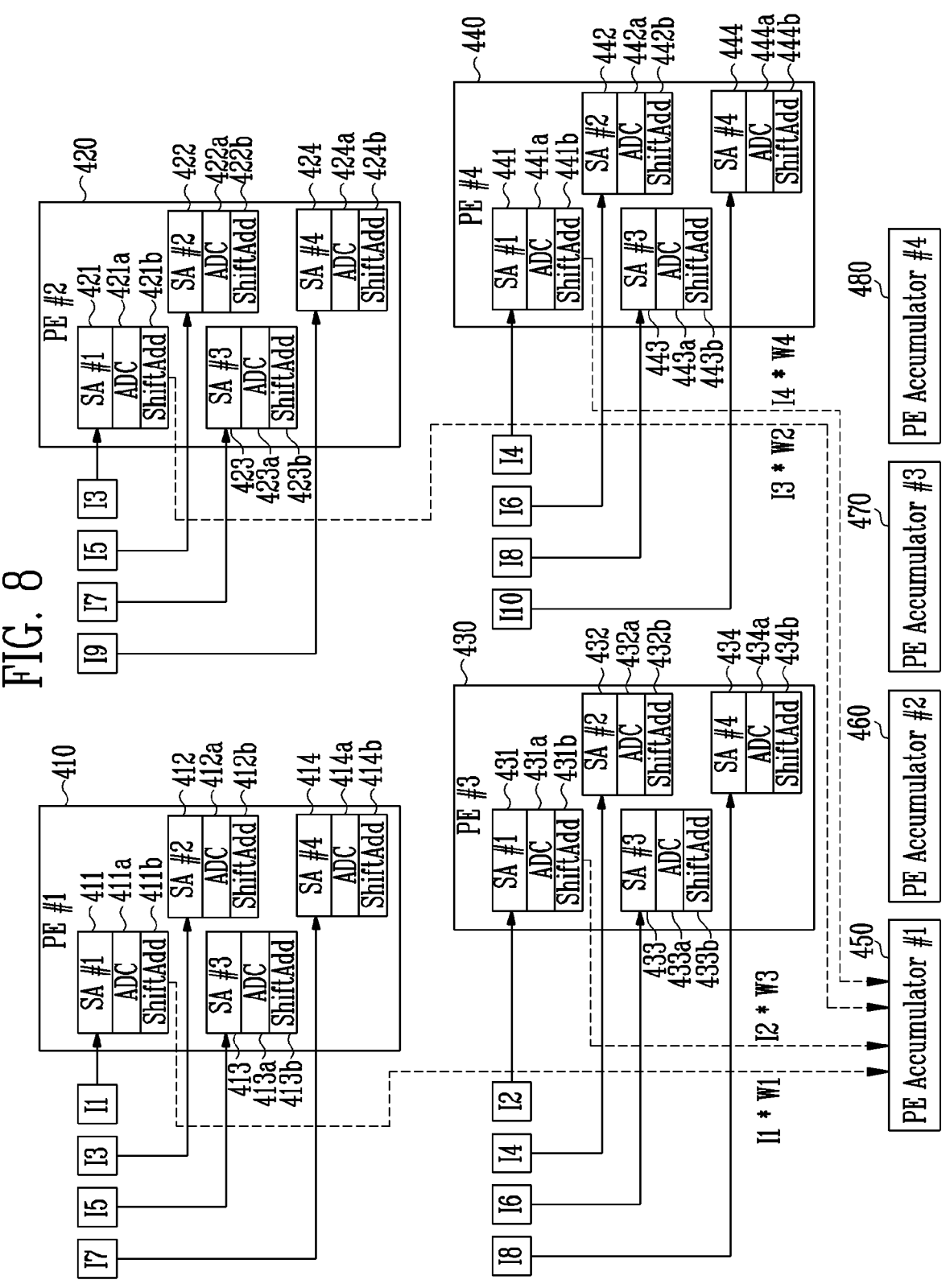
FIG. 8 is a block diagram illustrating a PE and a PE accumulator of a memory device according to an embodiment of the present disclosure.

FIG. 8 is a block diagram illustrating a PE and a PE accumulator of a memory device according to an embodiment of the present disclosure. Referring to FIG. 8, the first to fourth PEs 410 to 440 and first to fourth PE accumulators 450 to 480 shown in FIGS. 7A to 7D are shown in more detail. For convenience of description, illustration of other components is omitted.

As described above with reference to FIG. 7A, the first PE 410 includes the first to fourth synaptic arrays SA #1 to SA

4. In the embodiment of FIG. 8, the first PE 410 includes a plurality of ADCs and shift adders respectively connected to the first to fourth synaptic arrays SA #1 to SA #4. That is, the first PE PE #1 or 410 includes the first to fourth synaptic arrays SA #1 to SA #4 or 411, 412, 413, and 414, and first to fourth ADCs 411a, 412a, 413a, and 414a and shift adders 411b, 412b, 413b, and 414b corresponding to the first to fourth synaptic arrays SA #1 to SA #4 or 411, 412, 413, and 414, respectively. The second PEs PE #2 or 420 includes the first to fourth synaptic arrays SA #1 to SA #4 or 421, 422, 423, and 424, and first to fourth ADCs 421a, 422a, 423a, and 424a and shift adders 421b, 422b, 423b, and 424b corresponding to the first to fourth synaptic arrays SA #1 to SA #4 or 421, 422, 423, and 424, respectively. In addition, the third PE PE #3 or 430 includes the first to fourth synaptic arrays SA #1 to SA #4 or 431, 432, 433, and 434, and first to fourth ADCs 431a, 432a, 433a, and 434a and shift adders 431b, 432b, 433b, and 434b corresponding to the first to fourth synaptic arrays SA #1 to SA #4 or 431, 432, 433, and 434, respectively. Finally, the fourth PE PE #4 or 440 includes the first to fourth synaptic arrays SA #1 to SA #4 or 441, 442, 443, and 444, and first to fourth ADCs 441a, 442a, 443a, and 444a and shift adders 441b, 442b, 443b, and 444b corresponding to the first to fourth synaptic arrays SA #1 to SA #4 or 441, 442, 443, and 444, respectively.

In the present specification, the shift adder is a component including the adder 370 and the shift register 380 shown in FIG. 4.

Referring to the first PE 410, the data piece I1 is applied to the synaptic array SA #1 or 411 of the first PE 410. Meanwhile, a result I1·W1 obtained by multiplying the data piece I1 and the data piece W1 through the ADC 411a and the shift adder 411b is transmitted to the first PE accumulator 450.

Referring to the second PE 420, the data piece I3 is applied to the synaptic array SA #1 or 421 of the second PE 420. Meanwhile, a result I3·W2 obtained by multiplying the data piece I3 and the data piece W2 through the ADC 421a and the shift adder 421b is transmitted to the first PE accumulator 450.

Referring to the third PE 430, the data piece 12 is applied to the synaptic array SA #1 or 431 of the third PE 430. Meanwhile, a result I2·W3 obtained by multiplying the data piece I2 and the data piece W3 through the ADC 431a and the shift adder 431b is transmitted to the first PE accumulator 450.

Referring to the fourth PE 440, the data piece 14 is applied to the synaptic array SA #1 or 441 of the fourth PE 440. Meanwhile, a result I4·W4 obtained by multiplying the data piece I4 and the data piece W4 through the ADC 441a and the shift adder 441b is transmitted to the first PE accumulator 450.

The first PE accumulator 450 may receive an operation result by the first synaptic arrays SA #1, 411, 421, 431, and 441, the ADCs 411a, 421a, 431a, and 441a, and the shift adders 411b, 421b, 431b, and 441b respectively included in the first to fourth PEs 410 to 440, and add the operation result. Through this, the partial result $PR_{R1,C1}$ of the convolution operation described through Equation 1 may be generated.

The partial result $PR_{R1,C2}$ of the convolution operation in a situation in which the weight feature map is moved by 1 stride to the right, that is, in the state in which the weight feature map WFM is positioned at the position (R1, C2) may be performed by the second synaptic arrays SA #2, 412, 422, 432, and 442, the ADCs 412a, 422a, 432a, and 442a, and the shift adders 412b, 422b, 432b, and 442b respectively included in the first to fourth PEs 410 to 440, and the second PE accumulator 460. Meanwhile, the partial result $PR_{R1,C3}$ of the convolution operation in a situation in which the weight feature map is moved by 2 strides to the right, that is, in the state in which the weight feature map WFM is positioned at the position (R1, C3) may be performed by the third synaptic arrays SA #3, 413, 423, 433, and 443, the ADCs 413a, 423a, 433a, and 443a, and the shift adders 413b, 423b, 433b, and 443b respectively included in the first to fourth PEs 410 to 440, and the third PE accumulator 470. In addition, the partial result $PR_{R1,C4}$ of the convolution operation in a situation in which the weight feature map is moved by 3 strides to the right, that is, in the state in which the weight feature map WFM is positioned at the position (R1, C4) may be performed by the fourth synaptic arrays SA #4, 414, 424, 434, and 444, the ADCs 414a, 424a, 434a, and 444a, and the shift adders 414b, 424b, 434b, and 444b respectively included in the first to fourth PEs 410 to 440, and the fourth PE accumulator 480.

According to the embodiment shown in FIG. 8, each of the first to fourth PEs PE #1 to PE #4 includes the ADCs for converting a current output from the synaptic array to a digital value, and shift adders for performing a multiplication operation based on the digital value. In FIG. 8, when each of the first to fourth PEs PE #1 to PE #4 includes the ADCs and the shift adders, a substrate of a larger area may be required to implement the memory device. This is because many circuit elements are required to implement the ADCs and the shift adders. This causes an increase of a volume of the memory device implemented to perform the convolution operation. In addition, a manufacturing cost of the memory device increases.

According to a memory device according to an embodiment of the present disclosure, instead of implementing the ADC and the shift adder for each synaptic array, the ADC and the shift adder are provided at an input terminal of the PE accumulator. Accordingly, the number of ADCs and shift adders required to perform the convolution operation may be reduced, and as a result, the manufacturing cost of the memory device may be reduced. Hereinafter, the memory device in which the ADC and the shift adder are provided at the input terminal of the PE accumulator is described with reference to FIGS. 9 and 10.

Figure 9:
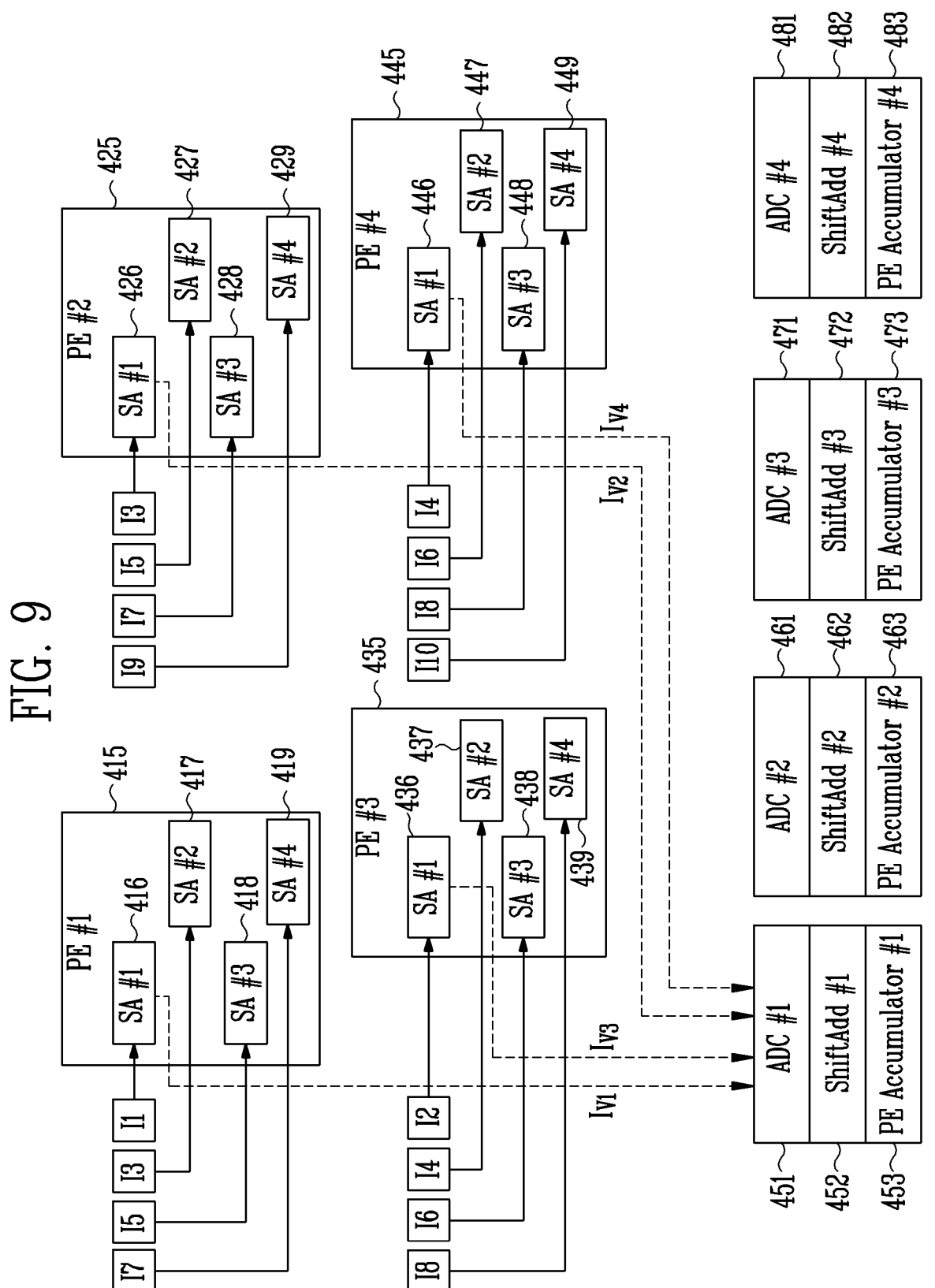
FIG. 9 is a block diagram illustrating a PE and a PE accumulator of a memory device according to another embodiment of the present disclosure.

FIG. 9 is a block diagram illustrating a PE and a PE accumulator of a memory device according to another embodiment of the present disclosure.

Referring to FIG. 9, first to fourth PEs 415, 425, 435, and 445 and first to fourth PE accumulators 453, 463, 473, and 483 in the memory device are shown. In FIG. 9, first to fourth ADCs 451, 461, 471, and 481 and first to fourth shift adders 452, 462, 472, and 482 respectively corresponding to the first to fourth PE accumulators 453, 463, 473, and 483 are shown. For convenience of description, illustration of other components is omitted.

As described above with reference to FIG. 7A, the first PE 415 includes the first to fourth synaptic arrays SA #1 to SA #4 or 416 to 419. Differently from the embodiment of FIG. 8, the first PE 415 of FIG. 9 does not include an ADC and a shift adder.

The second PE 425 includes first to fourth synaptic arrays SA #1 to SA #4 or 426 to 429. Differently from the embodiment of FIG. 8, the second PE 425 of FIG. 9 does not include an ADC and a shift adder.

Similarly, the third PE 435 includes first to fourth synaptic arrays SA #1 to SA #4 or 436 to 439. The third PE 435 does not include an ADC and a shift adder.

In addition, the fourth PE 445 includes first to fourth synaptic arrays SA #1 to SA #4 or 446 to 449. The fourth PE 445 does not include an ADC and a shift adder.

Referring to the first PE 415, the data piece I1 is applied to the first synaptic array SA #1 or 416 of the first PE 415. A first current $I_{V1}$ which is a result of synaptic processing of the first synaptic array SA #1 or 416 is transmitted to the first ADC 451 outside the first PE 415. Similarly, a second current $I_{V2}$ which is a result of synaptic processing of the first synaptic array SA #1 or 426 of the second PE 425 is transmitted to the first ADC 451 outside the second PE 425. Similarly, a third current $I_{V3}$ which is a result of synaptic processing of the first synaptic array SA #1 or 436 of the third PE 435 is transmitted to the first ADC 451 outside the third PE 435. Finally, a fourth current $I_{V4}$ which is a result of synaptic processing of the first synaptic array SA #1 or 446 of the fourth PE 445 transmitted to the first ADC 451 outside the fourth PE 445.

An input terminal of the first ADC 451 receives the first to fourth currents $I_{V1}$, $I_{V2}$, $I_{V3}$, and $I_{V4}$ output from the first synaptic arrays SA #1, 416, 426, 436, and 446 of each of the first to fourth PEs 415 to 445. According to Kirchhoff's law, the first to fourth currents $I_{V1}$, $I_{V2}$, $I_{V3}$, and $I_{V4}$ output from the first synaptic arrays SA #1, 416, 426, 436, and 446 of each of the first to fourth PEs 415 to 445 are added and input to the first ADC 451. The first ADC 451 digitally converts the received current and transmits the digitally converted current to the first shift adder 452. The first shift adder 452 performs a multiplication operation by shifting or adding digital values sequentially output from the first ADC 451. Hereinafter, the convolution operation of the memory device shown in FIG. 9 is described in more detail with reference to FIG. 10.

Figure 10:
FIG. 10 is a diagram illustrating a convolution operation of the memory device shown in FIG. 9 according to an embodiment of the present disclosure.

FIG. 10 is a diagram illustrating the convolution operation of the memory device shown in FIG. 9 according to an embodiment of the present disclosure.

Referring to FIG. 10, a method of calculating the partial result $PR_{R1,C1}$ of the convolution operation in the state in which the weight feature map WFM is positioned at the (R1, C1) is described. For convenience of discussion, both of "I3·W2" and "I4·W4" are 0. That is, in FIG. 10, a method of obtaining an addition of "I1·W1" and "I2·W3" among factors of the partial result $PR_{R1,C1}$ of the convolution operation is shown. In an example of FIG. 10, a convolution operation of a case where a value of the data piece I1 is 7, a value of the data piece W1 is 3, a value of the data piece I2 is 6, and a value of the data piece W3 is 5 is shown.

According to the embodiment shown in FIG. 8, a value of "I1·W1" is calculated by the first synaptic array 411, the first ADC 411a, and the first shift adder 411b of the first PE 410. That is, the first PE 410 directly outputs a digital value of "I1·W1" and transmits the digital value of "I1·W1" to the first PE accumulator 450.

As shown in FIG. 10, "I1·W1" is a product of 7 and 3, and the first ADC 411a and the first shift adder 411b calculate the value of "I1·W1" as described in Equation 5 below.

$$I1 \cdot W1 = 111_{(2)} * 011_{(2)} = 111_{(2)} * 1 * 2^0 + 111_{(2)} * 1 * 2^1 + 111_{(2)} * 0 * 2^2 = 21_{(10)} \qquad \text{[Equation 5]}$$

Moreover, "I2·W3" is a product of 6 and 5, and the first ADC 431a and the first shift adder 431b calculate a value of "I2·W3" as described in Equation 6 below.

$$I2 \cdot W3 = 110_{(2)} * 101_{(2)} = 110_{(2)} * 1 * 2^0 + 110_{(2)} * 0 * 2^1 + 110_{(2)} * 1 * 2^2 = 30_{(10)} \qquad \text{[Equation 6]}$$

The first PE accumulator 450 of FIG. 8 receives a value of 21 from the first PE 410 and receives a value of 30 from the third PE 430. The first PE accumulator 450 may add the received values of 21 and 30, and store a value of 51 which is a result of the addition.

According to the memory device shown in FIG. 9, first, at a time t1, a first current $I_{V1}(t1)$ output from the first synaptic array 416 of the first PE 415 and a third current $I_{V3}(t1)$ output from the first synaptic array 436 of the third PE 435 are input to the first ADC 451. According to Kirchhoff's law, the first current $I_{V1}(t1)$ and the third current $I_{V3}(t1)$ are summed and input to the first ADC 451 (①). As shown in FIG. 10, at the time t1, the sum of the first current $I_{V1}(t1)$ and the third current $I_{V3}(t1)$ is a value calculated by Equation 7 below.

$$I_{V1}(t1)+I_{V3}(t1)=111_{(2)}*0+110_{(2)}*1=6_{(10)} \qquad \text{[Equation 7]}$$

The sum of the first current $I_{V1}(t1)$ and the third current $I_{V3}(t1)$ is input to the shift register (②). At this time, an output value of the shift register may be calculated as in Equation 8 below.

$$(I_{V1}(t1)+I_{V3}(t1))*2^1=12_{(10)} \qquad \text{[Equation 8]}$$

Further, at a time t2, a first current $I_{V1}(t2)$ output from the first synaptic array 416 of the first PE 415 and a third current $I_{V3}(t2)$ output from the first synaptic array 436 of the third PE 435 are input to the first ADC 451. According to Kirchhoff's law, the first current $I_{V1}(t2)$ and the third current $I_{V3}(t2)$ are summed and input to the first ADC 451 (③). As shown in FIG. 10, at the time t2, the sum of the first current $I_{V1}(t2)$ and the third current $I_{V3}(t2)$ is a value calculated by Equation 9 below.

$$I_{V1}(t2)+I_{V3}(t2)=111_{(2)}*1+110_{(2)}*0=7_{(10)} \qquad \text{[Equation 9]}$$

A result value according to Equation 8 and a result value according to Equation 9 are input to the adder (④). Therefore, an output value of the adder may be calculated as in Equation 10 below.

$$(I_{V1}(t1)+I_{V3}(t1))*2^1+I_{V1}(t2)+I_{V3}(t2)=7_{(10)}+12_{(10)}=19_{(10)} \qquad \text{[Equation 10]}$$

A result value according to Equation 10 is input to the shift register again (⑤). At this time, an output value of the shift register may be calculated as in Equation 11 below.

$$((I_{V1}(t1)+I_{V3}(t1))*2^1+I_{V1}(t2)+I_{V3}(t2))*2^1=38_{(10)} \qquad \text{[Equation 11]}$$

At a time t3, a first current $I_{V1}(t3)$ output from the first synaptic array 416 of the first PE 415 and a third current $I_{V3}(t3)$ output from the first synaptic array 436 of the third PE 435 are input to the first ADC 451. According to Kirchhoff's law, the first current $I_{V1}(t3)$ and the third current $I_{V3}(t3)$ are summed and input to the first ADC 451 (⑥). As shown in FIG. 10, at the time t3, the sum of the first current $I_{V1}(t3)$ and the third current $I_{V3}(t3)$ is a value calculated by Equation 12 below.

$$I_{V1}(t3)+I_{V3}(t3)=111_{(2)}*1+110_{(2)}*1=13_{(10)} \qquad \text{[Equation 12]}$$

A result value according to Equation 11 and a result value according to Equation 12 are input to the adder (⑦). Therefore, an output value of the adder may be calculated as in Equation 13 below.

$$((I_{V1}(t1)+I_{V3}(t1)+2^1+I_{V1}(t2)+I_{V3}(t2))*2^1+I_{V1}(t3)+I_{V3}(t3)=38_{(10)}+13_{(10)}=51_{(10)} \qquad \text{[Equation 13]}$$

As a result of Equation 13, after the time t3, the first shift adder 452 may output a result value of 51 to the first PE accumulator 453. As described above, an operation result of the memory device shown in FIG. 9 may be the same as an operation result of the memory device shown in FIG. 8.

Comparing FIGS. 8 and 9 with each other, the ADCs are included in each of the PEs 410, 420, 430, and 440 in a case of FIG. 8, whereas in a case of FIG. 9, the ADCs are disposed outside each of the PEs 410, 420, 430, and 440. In the case of FIG. 8, each of the ADCs receives only the output from the synaptic array in the corresponding PEs, whereas in the case of FIG. 9, each of the ADCs receives the output from the synaptic array included in the plurality of PEs simultaneously. The outputs from the plurality of synaptic arrays are summed in a form of a current and input to the ADC. Accordingly, in a case of the embodiment shown in FIG. 9, the same result as the embodiment shown in FIG. 8 may be output. On the other hand, in a case of the embodiment shown in FIG. 9, the number of entire required ADCs may be reduced.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims. Furthermore, the embodiments may be combined to form additional embodiments.

What is claimed is:

1. A memory device for performing a convolution operation, comprising:
   a plurality of processing elements (PEs) respectively associated with at least one weight data piece included in a weight feature map and configured to perform a partial convolution operation with at least one input data piece included in an input feature map; and
   a plurality of circuits each receiving a result of the partial convolution operation from each of the plurality of PEs;
   wherein each of the plurality of circuits comprises:
   an analog-to-digital converter (ADC) configured to receive the result of the partial convolution operation from synaptic arrays included in the plurality of PEs;
   a shift adder configured to shift and add an output of the ADC; and
   an accumulator configured to accumulate an output from the shift adder, and
   wherein the ADC is configured to receive a sum of output currents that are simultaneously generated from the synaptic arrays of the plurality of PEs.

2. The memory device of claim 1, wherein each of the plurality of PEs includes first to N-th PEs, where N is a natural number greater than or equal to 2, and
   wherein each of the first to N-th PEs comprises first to k-th synaptic arrays, where k is a natural number equal to or greater than 2.

3. The memory device of claim 2, wherein a first ADC included in a first circuit of the plurality of circuits receives an output of a first synaptic array of each of the first to N-th PEs as a first result of the partial convolution operation.

4. The memory device of claim 3, wherein the first ADC receives a sum of an output current of the first synaptic array of each of the first to N-th PEs.

5. The memory device of claim 2, wherein a second circuit of the plurality of circuits comprises:
   a second ADC configured to receive a second result of the partial convolution operation from the first to N-th PEs;
   a second shift adder configured to shift an output of the second ADC; and
   a second accumulator configured to accumulate an output from the second shift adder.

6. The memory device of claim 5, wherein the second ADC receives an output of a second synaptic array of each of the first to N-th PEs as the second result.

7. The memory device of claim 6, wherein the second ADC receives a sum of an output current of the second synaptic array of each of the first to N-th PEs.

8. The memory device of claim 2, wherein each of the first to k-th synaptic arrays includes a plurality of memristors.

* * * * *